(12) United States Patent
Fasano et al.

(10) Patent No.: US 7,012,795 B2
(45) Date of Patent: Mar. 14, 2006

(54) ELECTROMAGNETIC CIRCUIT BREAKER ASSEMBLY HAVING REVERSE POLARITY PROTECTION

(75) Inventors: Michael Fasano, Waterbury, CT (US); Shakib Saria, Glastonbury, CT (US)

(73) Assignee: Carling Technologies, Inc., Plainville, CT (US)

( * ) Notice: Subject to any disclaimer, the term of this patent is extended or adjusted under 35 U.S.C. 154(b) by 555 days.

(21) Appl. No.: 10/352,783

(22) Filed: Jan. 28, 2003

(65) Prior Publication Data

US 2004/0145846 A1 Jul. 29, 2004

(51) Int. Cl.
H01H 73/00 (2006.01)
(52) U.S. Cl. ...................... 361/115; 361/102
(58) Field of Classification Search ............... 361/115, 361/102
See application file for complete search history.

(56) References Cited

U.S. PATENT DOCUMENTS 3,444,488 A * 5/1969 Harper ................... 335/10
4,347,488 A * 8/1982 Mune et al. .............. 335/9
5,144,517 A * 9/1992 Wieth ...................... 361/55
6,040,969 A * 3/2000 Winch et al. .............. 361/82

* cited by examiner

Primary Examiner—Ronald Leja
(74) Attorney, Agent, or Firm—McCormick, Paulding & Huber LLP

(57) ABSTRACT

An electromagnetic circuit breaker assembly, comprising at least one circuit breaker, is provided with a reverse polarity circuit that reduces the voltage presented to the terminals of the circuit breaker to which it is electrically connected when the terminals are further connected to a source of voltage in reverse polarity. The circuit breaker assembly is tripped due to the reverse polarity set-up, and remains tripped until the polarity is corrected. The electromagnetic coil is continuous provided with sufficient voltage so that the breaker may not be manually reset until the polarity is corrected. Preferably, the breaker is mechanically connected with another circuit breaker to create an assembly that will protect circuitry and devices against both a reverse polarity condition and an overload condition under normal operation. To this end, the reverse polarity circuit does not affect operation of the circuit breaker assembly if the polarity is in accordance with the normal set-up.

8 Claims, 8 Drawing Sheets

ELECTROMAGNETIC CIRCUIT BREAKER ASSEMBLY HAVING REVERSE POLARITY PROTECTION

FIELD OF THE INVENTION

The present invention relates to a circuit breaker assembly for accommodating reverse voltage polarity connections at its terminals without damaging the components of the circuit breaker assembly or polarity sensitive devices to which the circuit breaker assembly is connected due to the reverse polarity condition.

BACKGROUND OF THE INVENTION

An electromagnetic circuit breaker is basically a relay that operates to be a switch that is automatically opened when the armature is tripped, as for example when a current or voltage, or the combination of both, exceeds a certain limit. Typically, the automatic operation of such circuit breakers depends on an electromagnetic coil penetrating and a mechanism inside the circuit breaker. Such circuit breakers are also designed to be manually operated, for example with a handle or toggle actuator, but such breakers usually retain the capacity to be automatically tripped even if the handle is forcibly held in the on position so called "trip free" operation).

Such circuit breakers are designed to provide current and voltage through an electromagnetic coil to a load. The electromagnetic coil commonly surrounds a delay tube in which a plunger or core is adapted to be drawn magnetically toward a pole piece at the end of the delay tube by the flux created by the electromagnetic coil. The circuit breaker frame typically supports the coil and also supports a circuit breaker mechanism that is adapted to be tripped by a movable armature. The frame sets up a magnetic circuit with the coil and the armature. The armature when moved by the magnetic circuit engages a sear to open electrical contacts provided in an arc chamber that is also defined in the circuit breaker housing. Thus the breaker is a switch designed to automatically open in response to an over current and/or over voltage condition.

Typical circuit breaker housings are made in two half sections, each of which sections is molded from a plastic dielectric material. The half sections are held together by fasteners. The fastened housing supports the circuit breaker mechanism, frame, armature, and terminal components. The molded half sections are generally provided with slots to receive arc splitter plates that are arranged in spaced relationship along the path of movement for a movable contact as it travels from a closed position, in engagement with the fixed contact provided on one of the terminal studs in the circuit breaker housing, to an open position, where the movable contact is spaced from the fixed contact. The movable contact is generally provided on the underside of a movable contact arm that provides an electrical path through the movable contact to the fixed contact in the closed condition of the circuit breaker.

When circuit breakers are used in conjunction with sensitive DC electronic circuits, reverse polarity protection is important. Electronic circuits and devices to which magnetic circuit breakers are commonly connected are inherently polarity sensitive. Often, the breaker terminals are identical and reverse installation occurs.

Even with the protection afforded by present day breaker assemblies, the installer can fail to recognize the reverse connection and continually try to reset the breaker. Thus, the prior art designs permit continual resetting until the voltage polarity is corrected. Several reset cycles, however, may cause polarity sensitive circuit devices to be destroyed during such ill advised routing of a breaker assembly.

The present invention provides a redesigned voltage coil and polarity detection circuit. When a circuit breaker assembly is wired incorrectly with reversed polarity, the voltage coil of the present invention will trip another breaker mechanically connected thereto. The voltage coil is designed for continuous operation and remains energized as long as the voltage polarity is in the reverse direction. Further, the voltage breaker of the present invention is advantageously designed so that as long as a reverse polarity condition exists, the armature in the voltage breaker will be maintained in an OFF position (i.e., the armature is magnetically in contact with the pole), automatically the circuit breaker assembly from being rest. Thus, an installer would be unable to reset the circuit breaker assembly to the ON position or cause the contacts to re-engage. Further, the breaker will remain tripped even if the installer holds the switch in an ON position. Accordingly, momentary power and associated current inrushes commonly experienced with the prior art DC reverse polarity breakers are eliminated. Power may only be restored to the circuit which is being protected if the polarity is corrected.

The unique circuitry of the present invention does not disturb normal operation of the breaker in the event that polarization is correct. Only in the event of a reverse polarity set-up will the reverse polarity circuitry have any effect.

SUMMARY OF THE INVENTION

The present invention relates to a circuit breaker assembly for accommodating reverse voltage polarity connections at its terminals. In accordance with the present invention, a circuit breaker housing defines an internal chamber, an electromagnetic coil provided in said chamber, and a circuit breaker mechanism also provided in said chamber. The circuit breaker mechanism preferably includes a movable contact arm which moves from a closed position to an open position in response to an overload condition or a reverse polarity condition that is detected by the circuit breaker mechanism, a crank arm movable between an "on" and an "off" position, and a collapsible link coupling the movable contact arm to the crank arm. The collapsible link preferably collapses when the movable contact arm moves to the open position in response to an overload or reverse polarity condition, but the crank arm remains in the "on" position when the collapsible link collapses.

In further accordance with the present invention, a reverse polarity circuit is connected to the circuit breaker terminals, and presents an open circuit between the terminals when the terminals are connected to a source of voltage that is not reversed, and said circuit regulating the voltage of the source when the terminals are connected to the voltage source when the polarity is reversed.

In the preferred embodiment of the present invention, at least two circuit breakers are provided, one being a current breaker responsive to an over-current condition, and one being a voltage breaker responsive to an over voltage condition. In accordance with the present invention, the circuit breakers are mechanically connected so that when one trips, the other will also trip. Additionally, the terminals of both circuit breakers are connected to the source. Preferably, the reverse polarity circuit is provided in communication with the terminals of the voltage breaker and the current breaker, but only the latter has contacts that are opened to interrupt current.

DETAILED DESCRIPTION OF THE PREFERRED EMBODIMENTS

Figure 1:
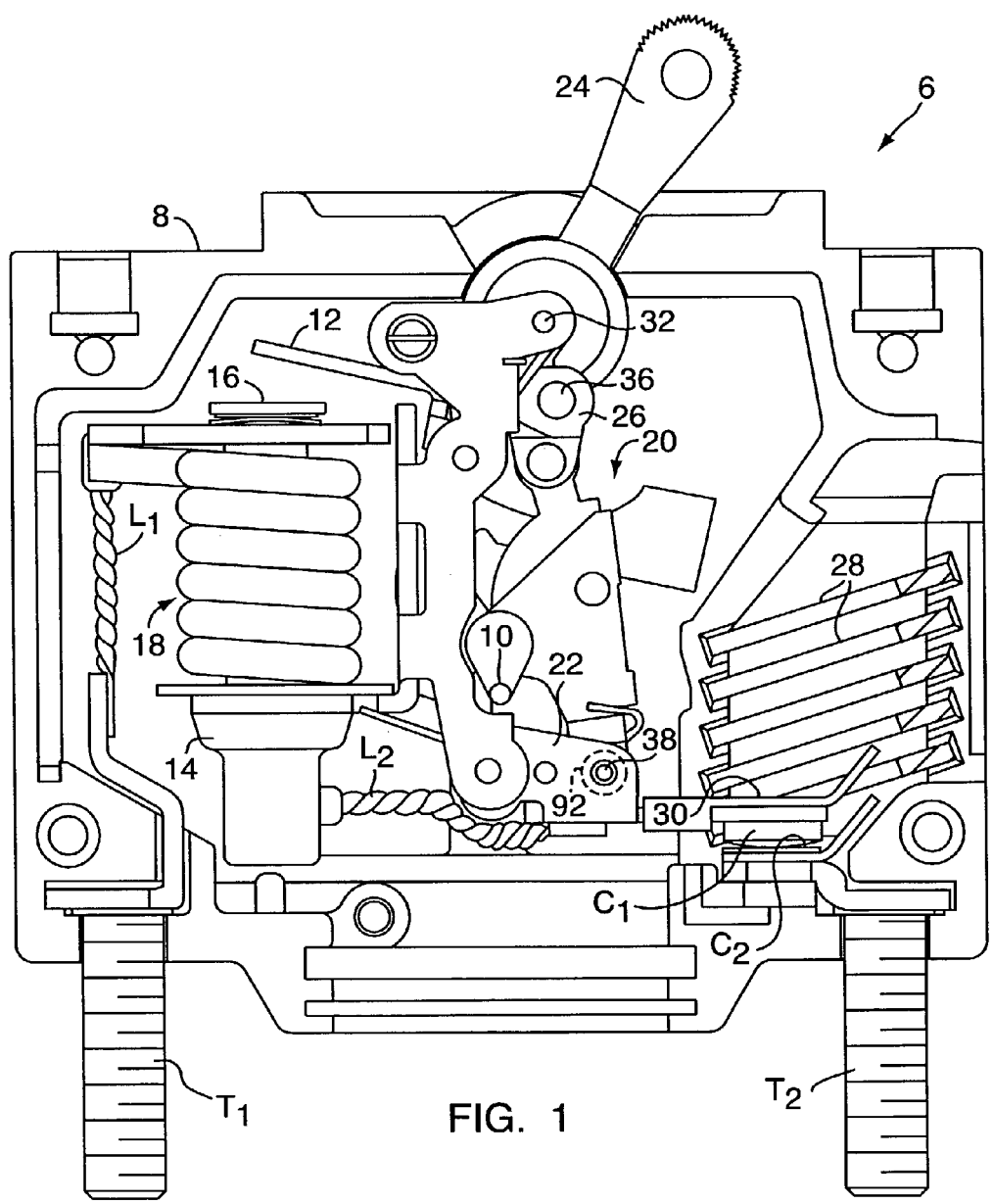
FIG. 1 is an elevational view illustrating one half section of the molded case circuit breaker housing showing the various components of a typical circuit breaker mechanism, including the terminals which provide the current and/or voltage through the breaker mechanism so that upon sensing an overload condition, the movable contact will move from a closed position to an open position.

Reference is now made to the drawings. FIG. 1 shows a magnetic circuit breaker 6 having a conventional circuit breaker mechanism, such as that disclosed in U.S. Pat. No. 4,347,488, entitled "MULTI-POLE CIRCUIT BREAKER", issued Aug. 31, 1982, and U.S. Pat. No. 5,744,772, entitled "MOLDED CASE CIRCUIT BREAKER WITH ARC SUPPRESSANT FEATURES INCLUDING MAGNETICALLY PERMEABLE ARC HORN MOUNTED ON THE CONTACT ARM", issued Apr. 28, 1998, both assigned to the assignee herein and incorporated herein by reference.

Such a circuit breaker 6 is connected in a circuit to be protected through terminals $T_1$ and $T_2$. Terminal $T_1$ is connected by a lead $L_1$ to an internal electromagnetic coil 18, and from the coil to the circuit breaker mechanism by a lead $L_2$. Thus, if the circuit breaker 6 were installed properly, terminal $T_1$ would be the positive connection to the voltage/current source, and terminal $T_2$ would be the negative connection to the voltage/current source for the voltage and current passing through circuit breaker 6.

A circuit breaker unit comprises a housing 8, often having two halves conventionally assembled to one another. The circuit breaker mechanism is provided inside the housing 8. The circuit breaker mechanism comprises a movable contact $C_1$ provided on a movable contact arm 22. When the movable contact arm 22 is in the position shown in FIG. 1, the movable contact $C_1$ is engageable with a fixed contact $C_2$ mounted on the fixed post of terminal $T_2$. This is the closed position of circuit breaker 6. When the movable contact arm 22 is in the position shown in FIG. 2, the movable contact $C_1$ is positioned away from fixed contact $C_2$, and no voltage or current runs through the circuit breaker 6. This is the opened position of circuit breaker 6.

Figure 2:
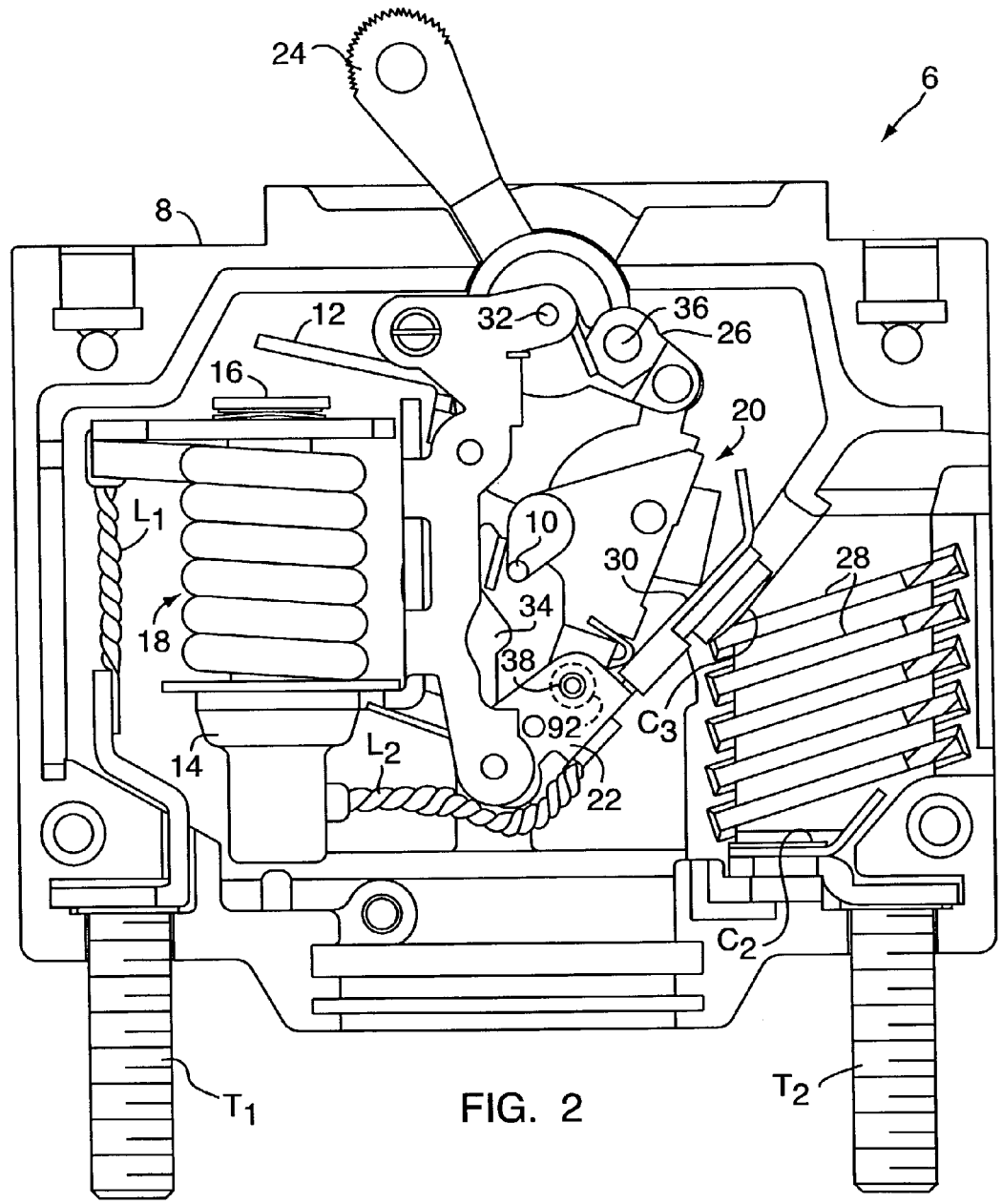
FIG. 2 is a view similar to FIG. 1, but illustrating the position of the movable contact arm in the open position and the toggle actuator in the "off" position.
Figure 3:
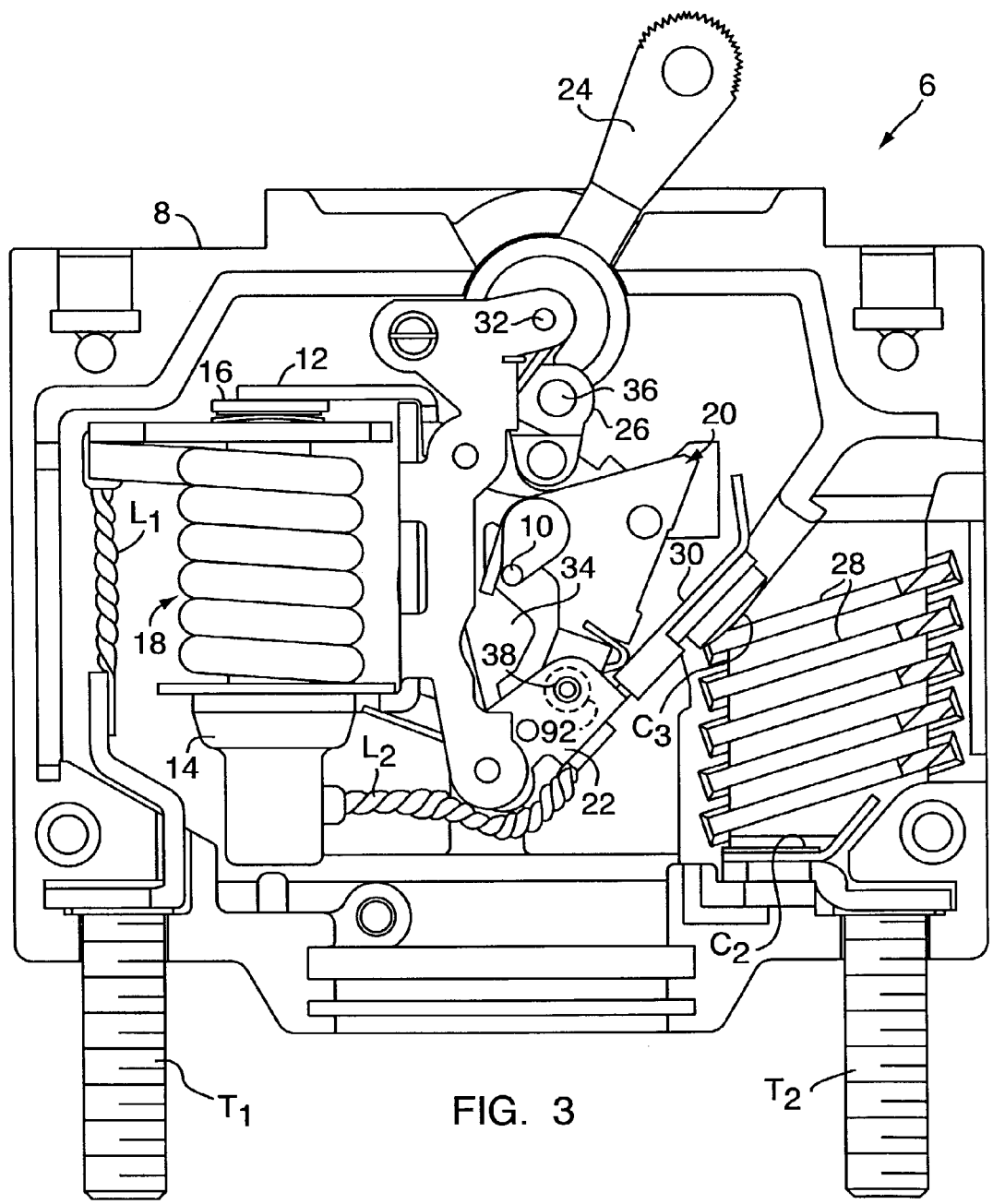
FIG. 3 is a view similar to FIG. 1, but illustrating the position of the movable contact arm in the open position, the toggle actuator in the "on" position, and the collapsible link in collapsed position.

The circuit breaker mechanism further includes a collapsible link 20 that is provided between movable contact arm 22 and a pivotably mounted toggle actuator 24. The collapsible link 20 is adapted to be operated without collapsing by the actuator 24 so as to achieve direct opening and closing movement of the movable contact arm 22 between the closed position and the opened position illustrated in FIG. 1 and FIG. 2 respectively. FIGS. 1 and 2 both show the collapsible link 20 in a locked or latched condition. FIG. 3 shows collapsible link 20 in its collapsed or unlatched condition, the purpose and function of which is discussed in more detail below.

With the movable contact arm 22 in the closed position (FIG. 1), electrical current can flow through the coil 18 and, unless the current flow is manually interrupted by movement of the toggle actuator 24, the current in any circuit in which the circuit breaker is provided will continue to flow until the current in that circuit and hence the coil 18 exceeds a predetermined level. When an overload condition occurs, the overload in the coil 18 will alter the magnetic circuit of the breaker mechanism, moving a core 16 inside the coil 18 and element 14 upwardly. The core 16 is spring biased downwardly inside the coil 18, said core 16 being magnetically moved upwardly against the force of the spring to magnetically attract armature 12 in response to the overload condition. Of course, the breaker may be designed to react to an underload condition, and trip when the current falls below a predetermined level. The breaker may be designed to react to over- or under-loads corresponding to current, voltage, pressure or the like.

The closing motion of the circuit breaker mechanism is achieved through the three-bar linkage consisting of the movable contact arm 22, the collapsible link 20, and a crank arm portion 26 of the toggle actuator 24. The toggle actuator 24 and the crank arm portion 26 are collectively spring biased about pivot pin 32. When armature 12 is pivoted by the magnetized core in reaction to an overload condition, the armature 12 will collapse or unlatch the collapsible link 20. The collapsing of collapsible link also coincides with the pivoting of movable contact arm 22 to the opened position.

Turning more particularly to the collapsible link 20, the movement of the toggle actuator 24 from the "on" position to the "off" position will cause the collapsible link 20 to move as a unit such that the circuit breaker 6 acts as a switch in being closed. To achieve an opening movement, the toggle actuator 24 is moved from the "off" position to the "on" position, and again, the collapsible link moves as a unit. Upon the occurrence of a predetermined overload condition, assuming the contacts $C_1$ and $C_2$ are prepositioned in the closed position shown in FIG. 1, the armature 12 is magnetized by the core 16 and pivoted about pin 32. The armature 12 includes a depending leg 34 that will force pin means 10 to rotate in a counterclockwise direction when the armature and depending leg 34 are pivoted, collapsing the link 20 so that the spring biased movable contact arm 22 moves from its closed position (FIG. 1) to its opened position (FIG. 3).

When the contact arm 22 is in the opened position, the toggle actuator 24 preferably remains in the "on" position, as shown in FIG. 3. The collapsible link 20 would be unlatched however, and this condition would be caused by an overload condition even with the toggle actuator 24 held or restrained in the "on" position. In this situation, the link 20 collapses independently of the toggle actuator 24 position, providing "trip free" breaker operation. In normal operation of the circuit breaker 6, movement of the toggle actuator 24 from the "on" position to the "off" position will result in return of the collapsible link 20 to the latched position, shown in FIGS. 1 and 2.

The configuration of the movable contact arm 22 is altered, at least in the magnetic sense, by the addition of a magnetically permeable arc horn 30. The arc horn 30 extends outwardly beyond the movable contact arm 22 and in a direction away from its pivoted end into the region of a plurality of arc splitter plates designated by reference numeral 28. Upon an overload condition, an electrical arc is created and is, at least initially, oriented between the contacts $C_1$ and $C_2$. The magnetically permeable arc horn 30 causes a magnetic flux pattern that effects and moves the electrical arc outwardly along the movable contact arm 22. As a direct result of this movement of the electrical arc, an increased voltage is generated for the arc, reducing the current in the arc, and hence providing a cooler arc condition inside the breaker housing.

Figure 4:
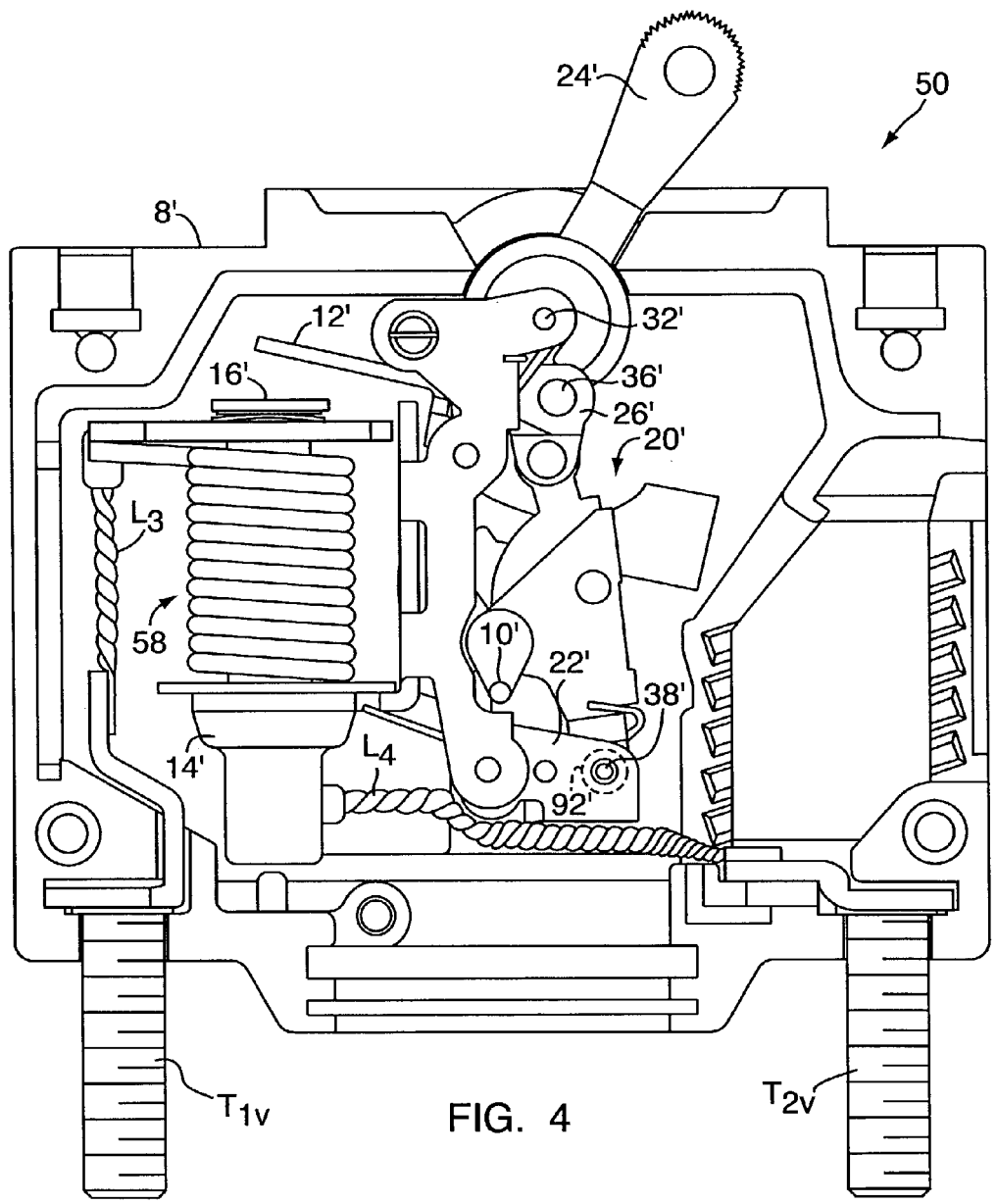
FIG. 4 is a view similar to FIG. 1, but illustrating one half section of the molded case voltage breaker housing showing the various components of a voltage breaker mechanism in accordance with the present invention, including the terminals which provide voltage through the breaker mechanism so that upon sensing a reverse polarity condition, the movable contact will move from a closed position to an open position.
Figure 5:
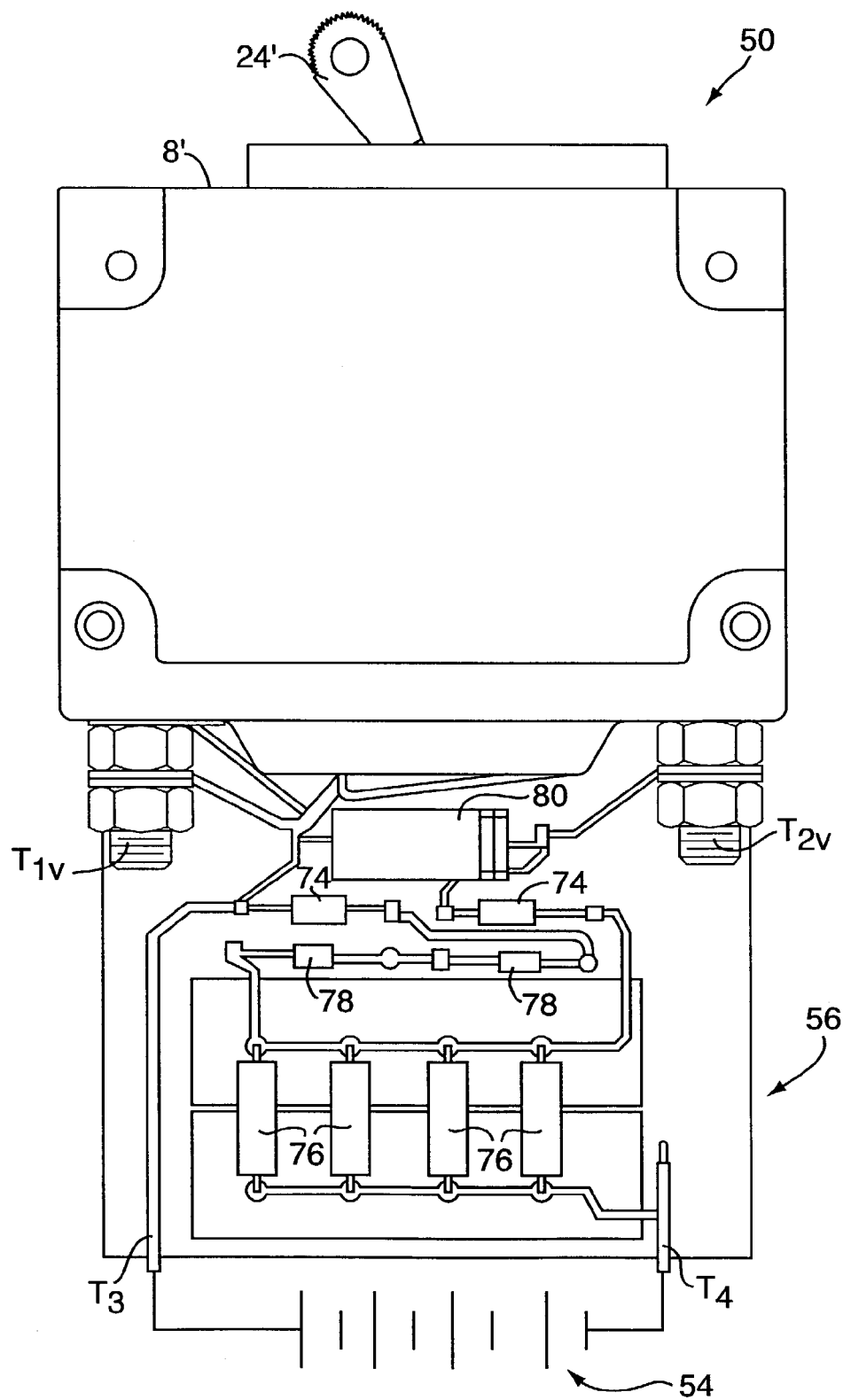
FIG. 5 is a front view of a circuit breaker assembly in accordance with the present invention.
Figure 6:
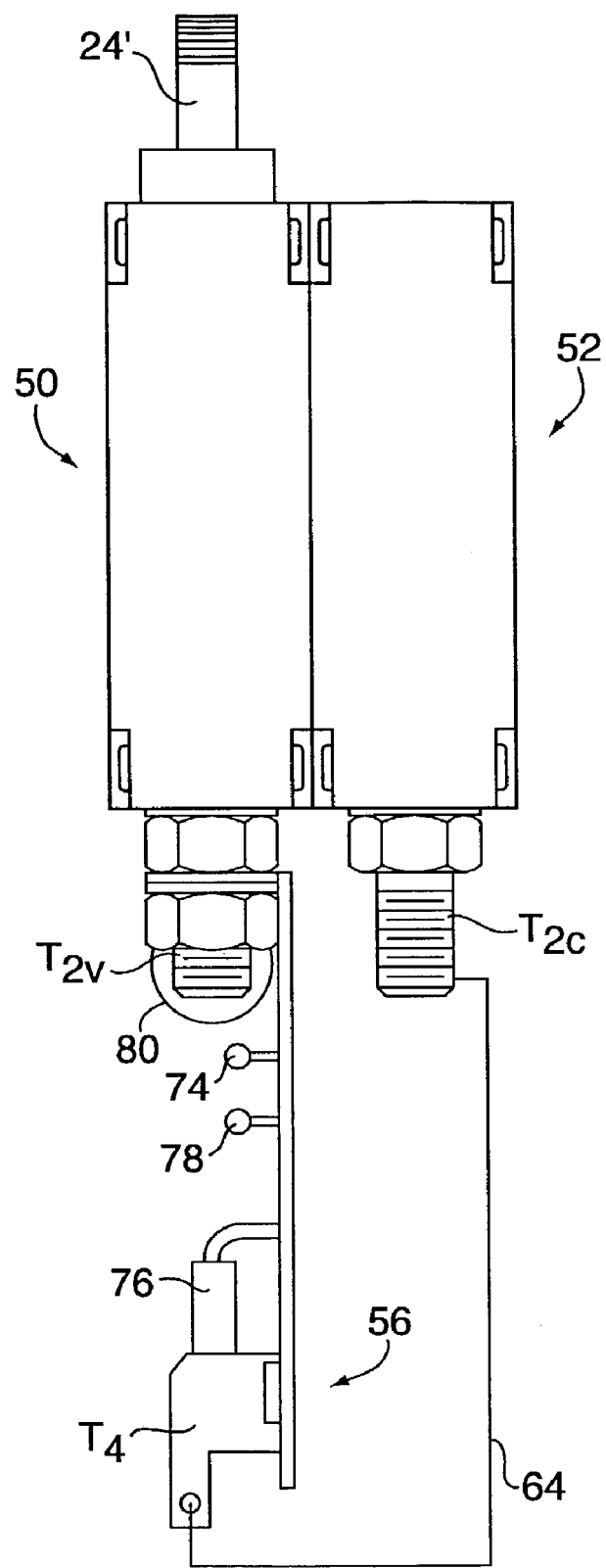
FIG. 6 is a side view of the circuit breaker assembly of FIG. 4.

In addition to the breaker 6 of FIGS. 1–3, the preferred embodiment of FIGS. 5 and 6 also includes a second breaker 50 (FIG. 4) alongside the breaker 6, but without the need for any moveable contact because this second breaker 50 is intended to trip only in response to over voltage condition (that is, to a condition other than the reverse polarity condition for which the circuit breaker assembly of FIGS. 5 and 6 is designed to provide protection).

Figure 7:
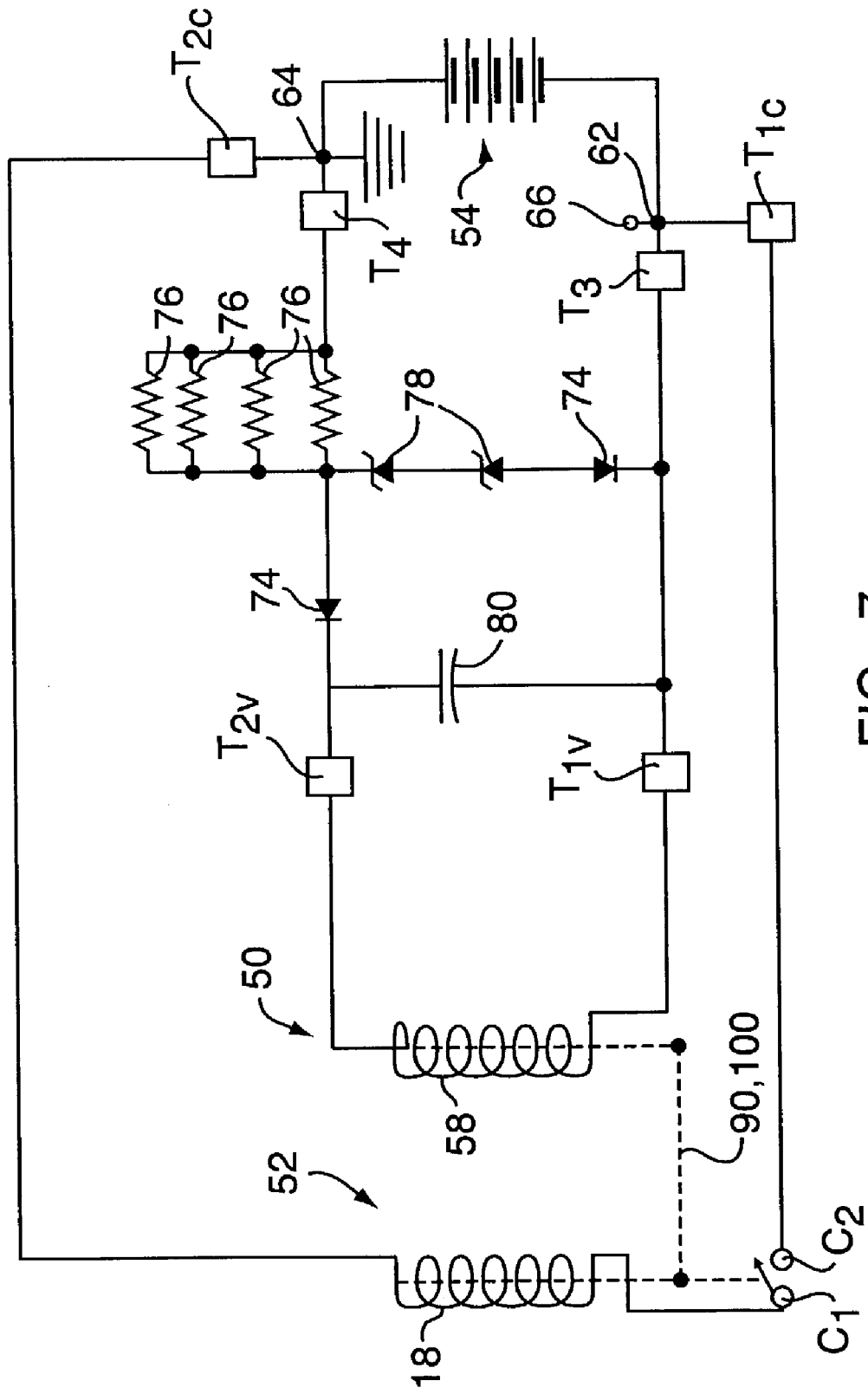
FIG. 7 is a schematic detailing the electrical connections of the circuit breaker assembly of the present invention

Breaker 50 is mechanically connected to the breaker 52 as suggested at 90,100 in FIG. 7, and this mechanical connection is preferably achieved by providing a common trip link between these breakers. Such an arrangement for a breaker assembly is well known, and the reader is referred to U.S. Pat. No.: 4,347,488 for one such mechanical connection. Other common trip links are also known and might be substituted for the arrangement of this '488 patent. For example, in FIG. 3 the pin 36 of breaker 6 might be linked to, or integral with the pin 36 of breaker 50 for this purpose.

As discussed in more detail below with reference to FIG. 7, the direct connection of leads $L_3$ and $L_4$ to terminals $T_{1V}$ and $T_{2V}$ permit continuous operation of voltage coil 58 if the voltage breaker 50 is connected with reverse polarity—i.e., the voltage coil 58 remains energized as long as the voltage polarity is in the reverse direction. Accordingly, the voltage breaker 58 is advantageously designed so that as long as a reverse polarity condition exists, the armature 12' will magnetically remain in contact with the pole 16' and prevent an installer/operator from manually resetting the voltage breaker 50 by using the toggle actuator 24'. Indeed, the voltage breaker 50 would re-trip before the circuit breaker mechanism can be locked, as shown in FIG. 4. This provides "trip free" operation, which is especially beneficial when the operator attempts to re-engage the circuit breaker mechanism by holding the toggle actuator 24' in an ON position. However, as noted above, even with the toggle actuator 24' held in the on position, the circuit breaker mechanism will remain tripped as long as the voltage breaker 50 is connected in reverse polarity and voltage is supplied to the voltage coil 58 via lead $L_4$.

The preferred assembly comprises two circuit breakers, voltage breaker 50 (as discussed above with respect to FIG. 4) and a current breaker 52 (having the design of circuit breaker 6 shown in FIG. 1) connected adjacent one another.

While the preferred embodiment shows two breakers in the circuit breaker assembly, the present invention may be adapted and used with more than two circuit breakers, and additionally, with just one circuit breaker.

Voltage breaker 50 is preferably designed to react to a pre-determined over voltage condition while current breaker 52 is designed to react to an over-current condition. Thus both, the current breaker 52 and the voltage breaker are designed to operate the circuit breaker assembly by the single set of contacts $C_1/C_2$ in the current breaker 52. Both breakers are connected to the same voltage source (54 in FIG. 7) and are mechanically connected so as to trip their respective armatures upon a pre-determined condition. For example, if installation of the circuit breaker assembly is normal or correct, the current will run through the current breaker 52. If an over-current condition is detected, current breaker 52 will trip. Correspondingly, the mechanically connected voltage breaker 50 will also trip in response to an over voltage condition, and open contacts $C_1/C_2$.

Voltage breaker 50 includes terminals $T_{1V}$ and $T_{2V}$, shown in FIGS. 4–6 as threaded members. Terminal $T_{1V}$ is connected by a lead to an internal electromagnetic voltage coil 58 as described above and shown in FIG. 7. The other end of coil 58 is connected by a lead to terminal $T_{2V}$. A reverse polarity circuit 56, described in more detail below, is electrically connected to terminals $T_{1V}$ and $T_{2V}$ and mechanically secured to the voltage breaker 50 by conventional means—e.g., about threaded terminals $T_{1V}$ and $T_{2V}$ with nuts and brackets as shown in FIG. 5. Reverse polarity circuit 56 has terminals $T_3$ and $T_4$ which are connected to voltage source 54 (shown more clearly in FIG. 7).

Current breaker 52 includes terminals $T_{1C}$ and $T_{2C}$, shown, in part, in FIG. 5 as threaded members. Terminal $T_{1C}$ is connected by a lead to an internal electromagnetic current coil 60 as described above and shown in FIG. 6. The other end of coil 60 is connected by a lead to terminal $T_{2C}$ via internal circuit breaker mechanism and contacts (see FIG. 1). The current coil 60 in current breaker 52 preferably is wound with heavier and thicker wire than that used for the voltage coil 58 in voltage breaker 50. The voltage source 54 is also connected to terminals $T_{1C}$ and $T_{2C}$, in addition to being connected to terminals $T_3$ and $T_4$ of reverse polarity circuit (shown more clearly in FIG. 7).

Figure 8:
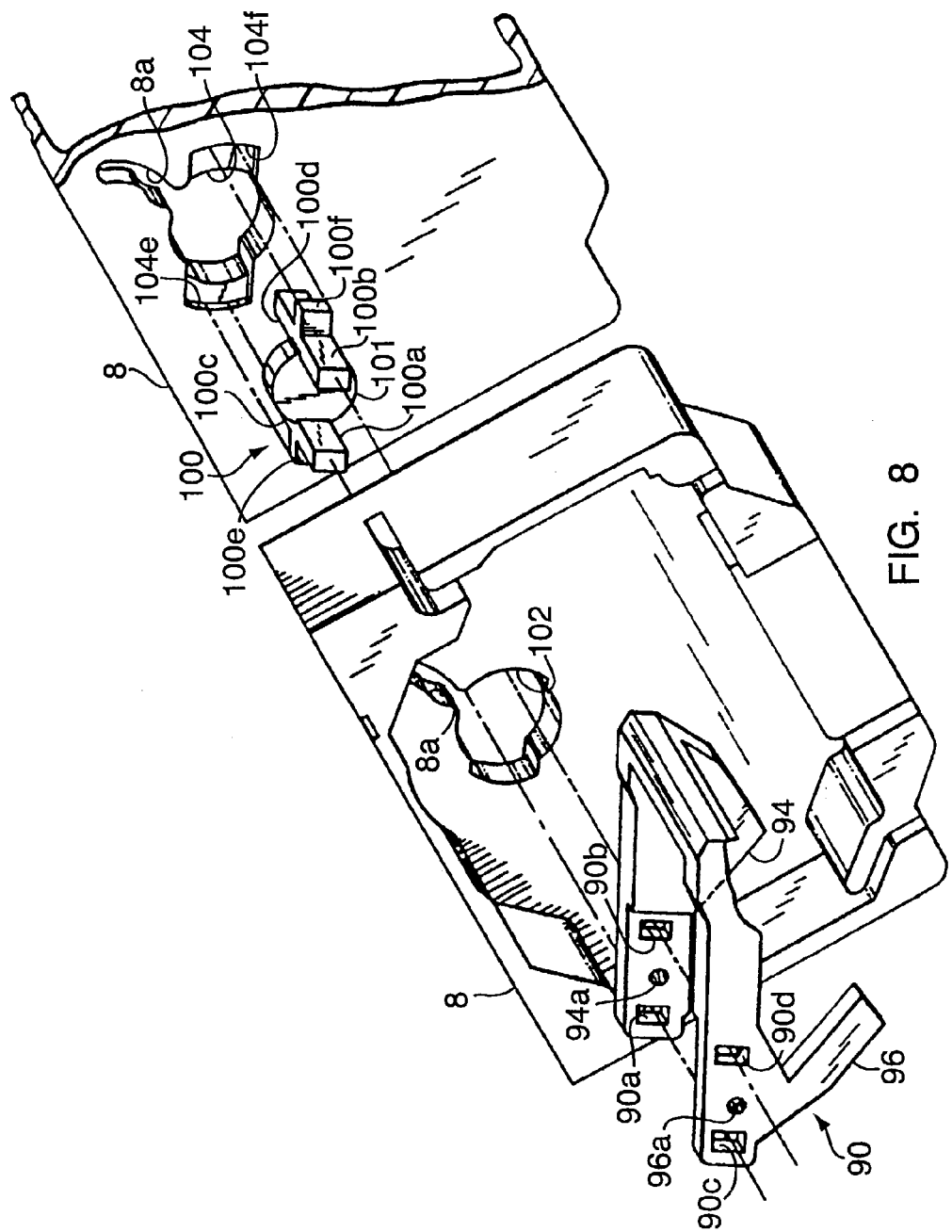
FIG. 8 is a perspective view of one common trip member and an adjacent circuit breaker unit housing together with the common trip coupler which serves to interconnect common trip members in adjacent circuit breakers.

Voltage breaker 50 and current breaker 52 are mechanically connected by a common trip member (see FIG. 8). Only one toggle actuator is needed for the entire circuit breaker assembly. As shown in FIG. 5, the voltage breaker 50 is provided with a toggle actuator 24' extending from the top of the circuit breaker housing. Current breaker 52 has a closed housing with no such actuator. The toggle actuator 24' is manually operated by both breakers together—i.e., when the toggle actuator 24' is moved to the "on" position, the respective armatures in both breakers are moved to their open positions, and contacts $C_1/C_2$ close. Similarly, when the toggle actuator 24' is moved to the "off" position, the respective armatures are closed and contacts $C_1/C_2$ opened. Alternatively, a toggle actuator may extend from just the current breaker 52 (e.g., toggle actuator 24 of FIG. 1). Further, toggle actuators may extend from both breaker housings. Thus, the voltage breaker 50 and current breaker 52 are adapted to be turned "on" and "off" in unison by means of a single toggle actuator 24'.

Turning now to the reverse polarity circuit 56 of the circuit breaker assembly of the present invention, a schematic of the preferred circuit is shown in FIG. 7. This schematic shows the circuitry of the preferred embodiment, although it is possible to adapt the present invention for use with more than two circuit breakers, or even with just one circuit breaker.

The DC voltage source is indicated schematically at 54. Under normal polarity, first connection 62 designates the positive connection from the source 54. Accordingly, voltage or current is provided from the source 54 to terminals $T_{1C}$ and $T_3$ via first connection 62. Second connection 64 designates the negative connection from the source 54 under normal polarity conditions. Accordingly, voltage or current flows through the respective breakers to terminals $T_{2C}$ and $T_4$, which are connected to the source 54 via second connection 64. Second connection 64 is also connected to ground. In a reverse polarity set-up (not shown in FIG. 7), the connections are reversed—i.e., second connection 64, and thus terminals $T_{2C}$ and $T_4$, are positively connected to the source 54, and first connection 62, and thus terminals $T_{1C}$ and $T_3$, are negatively connected to the source 54. The supply voltage input (VCC) for normal installation is designated by 66.

As noted above, terminals $T_{1C}$ and $T_{2C}$ are connected to current breaker 52 having current coil 60 and current switch 68. Terminals $T_3$ and $T_4$ are connected to the reverse polarity circuit 56, which in turn is connected to terminals $T_{1V}$ and $T_{2V}$ of voltage breaker 50 having voltage coil 58 and current switch 70. Mechanical connection between the respective breakers, effected by the common trip members 90 and common trip coupler 100, is designated in FIG. 6 by 72. The breakers are shown schematically in FIG. 7 and are described above.

The reverse polarity circuit 56 only affects operation of the circuit breaker assembly when the assembly is connected in reverse. That is, when the assembly is installed correctly with the positive connection at first connection 62 and the negative connection at second connection 64, the current breaker 52 operates conventionally and trips for an undesired over-current condition. The reverse polarity circuit 56 uses reverse biased diodes 74 along the voltage breaker line to render no current through the voltage coil 58 when the breaker assembly is installed correctly—i.e., diodes 74 are positioned so that there is an open circuit across diodes 74 when the voltage connection is in the normal direction. The positioning and direction of diodes 74 also assure that the reverse polarity circuit 56 is only activated in the event of a reverse polarity situation. In the reverse polarity situation, diodes 74 are in forward bias mode, inasmuch as the voltage and current flow is reversed. Accordingly, diodes 74 permit current to flow through the circuit 56 and the voltage coil 58 with such reversed voltage and current flow.

When the assembly is installed in reverse, the reverse polarity circuit 56 is preferably designed to detect the reverse polarity and trip the voltage breaker 50, and or the current breaker 52. Under such a reverse polarity situation, diodes 74 are in forward bias mode and permit some current to pass through the voltage coil 58. Voltage coil 58 continues to carry a limited current to keep the reverse polarity circuit energized at least until the polarity is corrected. The limited current in the voltage coil will not cause harm to the coil even if the polarity is not corrected for a long time. The voltage breaker 50, and the mechanically connected current breaker 52, can be reset without any damage to the circuitry and/or these breakers The reverse polarity voltage across the voltage breaker 50 is reduced by the reverse circuitry polarity. The reverse polarity circuit 56 comprises a plurality of resistors 76 in parallel, as shown specifically in FIG. 7 using four 1.5 kΩ resistors. Additionally, avalanche or zener diodes 78 are provided to reduce the voltage sensed by the voltage breaker 50 whenever a reverse polarity situation exists. For example, if the reverse polarity condition is on the order of 50 to 56 volts, the zener diodes 78 are provided in series to reduce the voltage by enough so that the voltage sensed by the voltage coil 58 is only on the order of 30 volts (well within the parameters necessary to assure extinguishing of the arc produced when the circuit breaker contacts are initially opened as a result of the reverse polarity condition). Preferably, the values of the resistors 76 and zener diodes 78 are selected so that the voltage breaker 50 sees only reverse dc voltages below 30 volts. Any voltage above 30 volts (up to the maximum voltage, which usually is about 60 volts), will be reduced by zener diodes 78. Under the reduced voltage, the resulting current in voltage coil 58 will not cause any damage to the coil 58 even if the installer fails to correct the polarity. That is, the voltage sensed by the voltage coil 58 will remain at the reduced level as long as the reverse polarity condition exists, with the result that a trip condition is maintained by the breaker assembly assuring that movement of the toggle actuator 24' cannot result in reclosing of the circuit breaker contacts as a result of an over zealous worker who repeatedly attempts to reset the breaker. The arcing of the breaker contacts $C_1/C_2$ characteristic of prior art DC breaker assemblies in avoided The resistors 76 act as a voltage divider to protect the zener diodes 78 from excessive voltage and current. Specifically, the resistors 76 reduce the voltage supplied to the zener diodes 78, which in turn allows the zener diodes 78 to regulate within their power limitations. Additionally, the resistors 76 act to dissipate the power caused by the voltage drop on the zener diodes 78.

A capacitor 80 is also provided in the reverse polarity circuit 56 for controlling and delaying the flow of current through the voltage breaker line, preferably in situations where there may be a spike of voltage. As such, capacitor 80 provides additional protection for the components of the voltage breaker 50 and circuitry to which the voltage breaker 50 is connected. The capacitor 80 shown in FIG. 7 is preferably a 100 μF capacitor.

The schematic view of FIG. 7 is provided for illustration, and several variations are envisioned for the specific arrangement and values of components in the reverse polarity circuit 56. For example, the overload conditions and predetermined amounts tolerated for operation of the breakers can be modified by making conventional and known adjustments to the circuit components. So two breakers can be designed to provide protection in other operating ranges.

A typical common trip member for use with the multi-breaker assembly shown in FIGS. 5–6, is shown in more detail in FIG. 8. This common trip member 90 has a general U-shape such that the legs of the U are adapted to be located adjacent the inside walls of the housing 8 of each breaker. A cam follower roller 92 is provided on the movable contact arm 22 at pin 38, such that roller 92 engages a portion of one leg of the U-shaped common trip member 90, such portion being generally indicated at 94. A portion of the other leg, generally indicated by 96, is engageable with the pin means 10. Openings 94a and 96a are provided in the respective leg portions 94 and 96, and are aligned with one another. It is a feature of the common trip member 90 that rotation of the member about the axis of rotation defined by aligned openings 94a and 96a, will cause the breaker to trip due to tripping of an adjacent breaker.

Each breaker unit has its own U-shaped common trip member 90 provided therein, and these trip members are mechanically connected to one another by a common trip coupler 100. Coupler 100 cooperates with trip members 90 in adjacent breakers to cause pivotal movement of one of said members for any of the reasons discussed above to move the coupler 100 and, in turn, effect pivotal movement of the trip member in adjacent breakers.

Coupler 100 has a disc portion 101 located in a generally circular recess or cavity defined by abutting side walls of the adjacent breaker housings, and more importantly, each such side wall has a circular opening 102 and 104, as indicated in FIG. 8. Coupler 100 also has oppositely arranged portions cooperating with portions of the U-shaped common trip member 90 inside each respective breaker housing. For example, coupler 100 has projections 100a and 100b corresponding to and fitting into openings 90a and 90b in the U-shaped trip member 90. Similarly, oppositely projecting portions 100c and 100d would fit into openings in a common trip member, such as 90c and 90d. Obviously, the trip member would receive the corresponding projections on an adjacent coupler (not shown), and the coupler 100 would have its projections 100c and 100d received in such openings provided in the trip member located in an adjacent breaker housing (not shown).

Coupler 100 also has projections 100e and 100f located in the plane of the generally circular disc portion 101. These projections 100e and 100f fit into corresponding recesses 104e and 104f so that the coupler is positioned between the adjacent breaker housing but remains free for arcuate movement.

An elongated bar 36 (as shown in cross section in FIG. 1) extends through openings provided in the crank arm portions 26 of the breakers, with the result that the crank arms of adjacent breakers are required to move in unison with one another. The breaker housings 8 are provided with aligned slots 8a as continuations of circular openings 102 and 104, to accommodate and provide a path of movement for elongated bar 36. Thus, in the circuit breaker assembly of FIGS. 5–6, the voltage breaker 50 and current breaker 52, in addition to being adapted to be turned "on" and "off" in unison by means of a single projecting toggle actuator 24', are also provided in an assembly wherein electromagnetic tripping of either the voltage breaker 50 or the current breaker 52 will necessarily trip the other through the common trip members 90, 90 and coupler 100 described above.

In summary, and with reference to FIG. 7, the current breaker 52 is of conventional configuration, and is connected across the source of DC voltage 54 via terminals $T_{1C}$ and $T_{1C}$. Once tripped by an over current, breaker 52 will no longer complete the necessary circuit to actuate the reverse polarity circuitry described above. A second breaker 50, wound to sense over voltage rather than current, is connected to the first breaker 52 by the common trip link (90/100/90). This second breaker (the voltage breaker 50) has no electrical contacts that can open, even if its armature be tripped by this common trip line (90/100/90). Indeed, this breaker is so wired that the DC voltage source 54 will power the reverse polarity circuit of FIG. 7 even when the first breaker 52 has had contacts $C_1/C_2$ open as shown in FIG. 7. The voltage coil 58 of this voltage breaker 50 continues to be energized, albeit under a reverse voltage condition, regardless of any attempts to reset the circuit breaker for assembly by the handle 24. As a result, the breaker assembly, and any electrical load downstream thereof, is unprotected against inadvertent reverse polarity installation.

Although this invention has been shown and described with reference to the detailed embodiment described above, it will be understood by those skilled in the art that various changes in form and detail thereof may be made without departing from the spirit and scope of the invention.

We claim:

1. A circuit breaker assembly comprising;
   first and second electromagnetic circuit breakers, each having linkages including electromagnetic coils and armatures,
   a common trip link coupling said linkages to trip both linkages in response to movement of either armature in response to energizing of either coil, said circuit breakers having terminals electrically connected to said coils respectively,
   a reverse polarity circuit coupled between said circuit breaker terminals, said reverse polarity circuit when conductive serving to reduce the voltage presented to the terminals of said first circuit breaker while such voltage is reversed,
   said second breaker having its terminals connected in electrical parallel with said first circuit breaker terminals during a reverse polarity condition, and
   said first circuit breaker having contacts that open to interrupt current through its coil, and said second circuit breaker being electrically uninterruptible so that said reverse polarity circuit remains conductive at said reduced voltage to protect the breaker assembly and any load circuit associated therewith when resetting said breaker assembly under continuing reverse polarity conditions.

2. The circuit breaker assembly of claim 1 wherein said common trip link comprises:
   a common trip member pivotally mounted inside each housing of the first and second circuit breaker, said common trip member having a general U-shape with the legs defining the pivot for the common trip member and with one leg having a portion engageable by a respective movable contact arm; and
   a common trip coupler between the circuit breaker housings, said coupler having portions cooperating with the common trip members inside the associated circuit breaker housings to cause pivotal movement in one such common trip member to move the coupler and in turn to effect pivotal movement of the common trip member in the other housing.

3. The circuit breaker assembly of claim 1, wherein said reverse polarity circuit comprises at least one diode connected in the reverse polarity circuit so that said diode is connected in reverse biased mode when the circuit terminals are electrically connected to the voltage source in normal polarity, and wherein said diode is connected in forward biased mode when the circuit terminals are electrically connected to the voltage source in reverse polarity.

4. The circuit breaker assembly of claim 3, wherein said reverse polarity circuit comprises at least one zener diode that reduces the voltage passing through said reverse polarity circuit and the breaker terminals when the circuit terminals are electrically connected to the voltage source in reverse polarity.

5. The circuit breaker assembly of claim 4, wherein said reverse polarity circuit reduces the voltage from between about 30 and 60 volts to a maximum of 30 volts.

6. The circuit breaker assembly of claim 4, wherein said reverse polarity circuit comprises at least two resistors connected in parallel relationship that reduce the voltage passing through said zener diodes when the circuit terminals are electrically connected to the voltage source in reverse polarity.

7. The circuit breaker assembly of claim 6, wherein said reverse polarity circuit reduces the voltage from between about 30 and 60 volts to a maximum of 30 volts.

8. The circuit breaker assembly of claim 1 wherein said reverse polarity circuit is provided on a circuit board mounted to the terminals of at least one of said first and second circuit breakers in said circuit breaker assembly.

* * * * *